US006613114B1

(12) United States Patent
Alary

(10) Patent No.: US 6,613,114 B1
(45) Date of Patent: Sep. 2, 2003

(54) ABRASIVE GRAINS CONSISTING OF POLYCRYSTALLINE ALUMINA

(75) Inventor: Jean-André Alary, Chedde (FR)

(73) Assignee: PEM Abrasifs-Refractaires, Courbevoie (FR)

( * ) Notice: Subject to any disclaimer, the term of this patent is extended or adjusted under 35 U.S.C. 154(b) by 0 days.

(21) Appl. No.: 09/913,137

(22) PCT Filed: Feb. 9, 2000

(86) PCT No.: PCT/FR00/00299

§ 371 (c)(1),
(2), (4) Date: Jan. 17, 2002

(87) PCT Pub. No.: WO00/47688

PCT Pub. Date: Aug. 17, 2000

(30) Foreign Application Priority Data

Feb. 15, 1999 (FR) .............................................. 9901962

(51) Int. Cl.⁷ .............................. C09K 3/14; C01F 7/02
(52) U.S. Cl. ........................... 51/309; 51/307; 501/127; 423/625; 264/5; 264/12
(58) Field of Search ........................... 501/127; 51/307, 51/309; 423/625; 264/5, 12, 332

(56) References Cited

U.S. PATENT DOCUMENTS

| 1,798,261 A | | 3/1931 | Horsfield | |
|---|---|---|---|---|
| 1,871,793 A | | 8/1932 | Horsfield | |
| 1,894,208 A | * | 1/1933 | Girsewald et al. | |
| 3,181,939 A | * | 5/1965 | Marshall et all. | ............. 51/309 |
| 3,781,172 A | * | 12/1973 | Pett et al. | ................. 23/305 A |

FOREIGN PATENT DOCUMENTS

| EP | 0 355 481 | 2/1990 |
|---|---|---|
| FR | 1319102 | 8/1963 |
| GB | 284131 | 1/1928 |
| GB | 1595196 | 8/1981 |

* cited by examiner

*Primary Examiner*—Michael Marcheschi
(74) *Attorney, Agent, or Firm*—Connolly Bove Lodge & Hutz LLP

(57) ABSTRACT

The invention relates to an abrasive grain based on electromelted alumina consisting of crystals with a hexagonal structure, of size less than 100 μm, and preferably less than 30 μm, and more preferably less than 5 μm, with density higher than 97%, preferably 98%, of the theoretical density of alumina, and a Knoop hardness higher than 2000. The invention also relates to a method for making abrasive grains based on alumina consisting in melting alumina, casting it at a constant flow rate less than 80 kg/mn, and cooling it by dispersing the melted alumina in fine droplets to obtain articles with size less than 1 mm. The dispersion is preferably performed by ultrasound-assisted spraying, at a frequency ranging between 15 and 50 MHz. The inventive grains are used in particular for making grindstones.

10 Claims, No Drawings

ABRASIVE GRAINS CONSISTING OF POLYCRYSTALLINE ALUMINA

TECHNICAL FIELD

The invention relates to alumina-containing abrasive grains formed of crystals having a size of approximately a few dozen microns, obtained by quick solidification of molten alumina.

PRIOR ART

The use of abrasives containing alumina is a very old practice dating back to the use of emery already known to the Greeks. Since the mid-$20^{th}$ century the synthesis of corundum, obtained by melting and solidifying alumina, has provided abrasive grains made up of α alumina crystals with a compact hexagonal structure, having a size of several millimetres. Through misuse of language, this type of material was given the name of electro-fused corundum. It is of course a solid material whose denomination alludes to the method of preparation.

The abrasive grains obtained by grinding electro-fused corundum are, for the most part, made up of hexagonal monocrystals and their mechanical properties are those of alumina crystals and cannot be improved.

To obtain improved mechanical and abrasive properties it has long been sought to produce a material made of crystals as small as possible, each abrasive grain being formed of an assembly of crystals, so that its mechanical properties are imparted not only by the nature of the crystals of which it is made up, but also and above all by the existence of numerous grain joints enabling grain consolidation.

Hence U.S. Pat. No. 1,192,709 (Carborandum) filed in 1914, describes electro-fused alumina with crystals of between 10 and 300 μm in size (average of 100 μm) cast in thin plates in a narrow ingot mould less than 150 mm thick. This means of quick solidification was also investigated by Alcoa in 1932 (U.S. Pat. No. 1,798,261 and U.S. Pat. No. 1871793) which suggested atomizing electro-fused alumina to convert it into hollow spheres having a diameter of less than 5 mm and formed of crystals of less than 250 μm. A fairly similar technique is described in patent GB 284131 by Metallbank. U.S. Pat. No. 3,781,172 allows crystals of electro-fused alumina to be obtained that are less than 50 μm in size by casting the alumina on a bed of cold granules having the same composition, which accelerates cooling. Experience has shown, however, that this technique does not give a good yield, since the liquid alumina does not penetrate well between the cold grains.

Patent FR 1319102 (Norton) filed in 1961, describes a method and means for quick-cool casting of alumina abrasives, consisting of casting a thin strip on a rotating cylinder. The crystals obtained have a size of between 1 and 30 μm. Patent FR 2242462 (Norton) filed in 1977 relates to a method and equipment for casting abrasives between two metal plates to form a thin strip. The quenching effect is limited in this case by the low thermal conductivity of corundum. These thin-plate casting methods do not appear to have led to any production at industrial level.

1979 saw the introduction of alumina derived from a sol-gel method, obtained by calcining and sintering alumina hydrate, most often boehmite, itself obtained by precipitation from a solution of an aluminium salt or alkoxide. With this type of material it is possible to prepare abrasive grains formed of an assembly of crystals having a size of less than one micron, which gives them excellent mechanical properties. Today this material is routinely used for the production of grindwheels to the proportion of approximately 30% by weight of the total composition, the remainder being conventional electro-fused corundum. The high cost of sol-gel alumina is the reason most frequently put forward to account for this proportion of 30%.

The purpose of the present invention is to provide an electro-fused alumina, which maintains the morphology particular to electro-fused aluminas, but has much finer controlled crystallisation than the corundum of the prior art and clearly improved abrasive properties.

OBJECT OF THE INVENTION

The object of this invention is an abrasive grain containing electro-fused alumina, characterized in that it is formed of crystals of hexagonal structure less than 100 μm is size, preferably less than 30 μm, and further preferably less than 5 μm, whose density is greater than 97%, preferably 98%, of the theoretical density of alumina and whose Knoop hardness is more than 2000.

A further object of the invention is a method for producing alumina-based abrasive grains, comprising the melting of alumina, its casting at a constant flow rate of less than 80 kg/min, and its cooling by dispersing the molten alumina in fine droplets to produce particles having a size of less than 1 mm. This dispersion is preferably conducted by ultrasound-assisted atomization using a frequency of between 15 and 50 MHz.

DISCLOSURE OF THE INVENTION

By analyzing the properties of sol-gel aluminas and the results obtained with grindwheels made with this type of material, the applicant arrived at the following conclusions:

- the hardness of sol-gel aluminas is very high (HK Knoop hardness of 2100 to 2200) much greater than the hardness of electro-fused corundum of the prior art.
- the particles of sol-gel alumina and the particles of electro-fused corundum have different morphologies: while the particles of electro-fused corundum are angular and have sharp edges, the particles of sol-gel aluminas are much more massive and have a rounded shape.
- the microstructure of sol-gel alumina is very fine and made up of hexagonal crystals of x alumina of submicron size, whereas the microstructure of electro-fused aluminas is essentially monocrystalline.
- grindwheels made of different proportions of sol-gel alumina and corundum have shown that a grindwheel made with 100% sol-gel alumina gives poor results, and the association of corundum and sol-gel alumina is indispensable in order to obtain the result levels claimed by manufacturers of sol-gel alumina.

Attributing such good results to the association of a cutting product, corundum, with a very hard reinforcement material, sol-gel alumina, which conflicts with everything that has been said or written on the matter, the applicant therefore sought to assemble in one single material the morphology of as electro-fused corundum grains and the hardness of sol-gel alumina. The solution investigated was quick solidification for the precise purpose of obtaining crystallization that is as fine as possible.

Having regard to the physical properties of corundum (solidifying point and thermal conduction in the solid state), the conventional techniques used to obtain quick solidification proved to be largely insufficient to obtain sufficient reduction in crystal size.

Therefore, experience has shown that to obtain crystals of approximately 200 μm, casting needs to be made to a thickness of 5 mm, which is both highly restrictive and little productive in respect of the crystal size obtained. Atomization was suggested by U.S. Pat. No. 1,871,793 already cited, with which it is possible to obtain hollow spheres with a diameter of less than 5 mm and a wall thickness of less than 250 μm. No indication is given as to the size of the crystals. Other methods of quick solidification were put forward at a later date, such as those described in Norton patents FR 1319102 and FR 2422462 which describe cooling rates comparable with those of conventional quenching techniques leading to relatively coarse crystal sizes of the order of 200 μm. They are therefore of little practical interest. It is to be noted however that obtaining finer crystallization would be advantageous, since it modifies the behaviour of the material during grinding and can achieve a distribution of grain size which is maximum at the screen size corresponding to the size of the crystals.

Wishing to investigate means able to further improve the performance of abrasive grains containing electro-fused alumina obtained by quick solidification, the applicant found that one important parameter in order to obtain very fine crystallisation is the casting flow rate of the liquid corundum which must be maintained below 80 kg/min, preferably below 50 kg/min. This flow rate, markedly slower than the usual rate used, may be obtained by using a heated casting nozzle, heated by induction for example, in order to avoid early solidification inside the nozzle.

The applicant also found that it is possible, compared with the techniques of the prior art, to improve the dispersion of the corundum in the liquid state before it is solidified. Atomization in air or water granulation prove to be insufficient means to obtain adequate dispersion of the liquid corundum, and it is necessary to add additional means in order to obtain a particle size of no more than 1 mm, in the region of a few tenths of a mm. At such sizes, the material is in the form of more or less spherical beads, either solid or hollow accordingly, and chiefly made up of crystals whose size varies between approximately 20 and 30 μm for beads with a diameter of close to 1 mm, up to 10 μm for beads with a diameter of 0.2 mm.

One particularly effective means to obtain this dispersion is atomization assisted by ultrasound using a frequency of preferably between 15 and 50 kHz.

When solidified in this way, electro-fused corundum maintains its main quality which is to yield grains with sharp edge morphology; it also has greater density and hardness than the electro-fused corundum of the prior art; when using this technique it is possible to reach a density of 3.95, that is to say a density that is greater than 98% of the theoretical density of alumina (3.98) and a Knoop hardness of 2050. With its high density, the polycrystalline grain shows properties that are close to those of a perfect monocrystalline grain.

The material obtained in this manner, which does not have the same hardness as sol-gel alumina, does however show a better compromise in terms of grain shape, hardness and cost.

EXAMPLES

Example 1

In a conventional electric arc furnace, alumina containing 99.5% $Al_2O_3$ is melted by bringing it to a temperature of approximately 2200° C. The content of the furnace is cast in discontinuous manner.

Using ingot moulds intended to take a mass of approximately ten tonnes of melted corundum, ingots are obtained by slow solidification which are formed of a material having a coarse structure and disrupted by numerous porosities; around the edge of the ingots the size of the crystals is a few mms whereas, at the core, crystal size attains several cms.

After grinding to 1 mm, the material obtained is essentially made up of monocrystalline grains with a hexagonal structure having a density of approximately 3.7 and a Knoop hardness of 1900. The proportion of grains with P80 grain size (according to the nomenclature published by the European Federation of Abrasive Producers EFAP), that is to say grains of which one half are greater than 185 μm, is approximately 18%.

Example 2

Using the same melting means as in example 1, but limiting furnace tilt so that the flow rate of the liquid corundum does not exceed 1.5 t in 10 min, the liquid corundum is cast onto a copper plate that is water-cooled on the inside. The copper plate is tilted to 30° to limit the thickness of the corundum strip solidifying on the copper. In this way strips approximately 5 mm thick are obtained which are then ground to 1 mm.

The proportion of P80 grains is 38%, markedly higher than in the previous example. Examination of the grains obtained shows that the material prepared in this manner is chiefly made up of hexagonal crystals having a size range of 150 to 250 μm. Density is 3.8 and Knoop hardness 1925.

Example 3

Using the same melting means as in example 1, and under the same furnace tilting conditions as in example 2, liquid corundum is cast into a channel and is atomized at the channel outlet by means of a stream of air. In this way hollow beads are obtained whose outer diameter is less than approximately 5 mm. These beads are formed of crystals of hexagonal structure whose size ranges from 100 to 250 μm. Density is 3.85 and Knoop hardness is 1950.

Example 4

In a 1 MW arc furnace, a continuous casting nozzle is adapted to the bottom of the vessel having a flow diameter of 12 mm; the nozzle is heated by induction using a 10 kHz generator; the available power at the generator is 50 kW. The furnace is supplied with the same raw material as in the three previous examples. The flow rate of liquid corundum obtained through the nozzle is 36 kg/min.

This stream of liquid corundum is directed onto a sonotrode made up of a titanium plate with 45° tilt, set in vibration by an ultrasound source at a frequency of 15 kHz. The stream of melted corundum is dispersed in particles of approximately 0.1 mm, and it is found that the stream of molten material does not come into contact with the sonotrode, leaving a gap of approximately 1 mm between the sonotrode and the stream of liquid.

Examination of the material obtained shows that it is chiefly made up of elementary crystals having a size of less than 5 μm, a density of 3.95 and a Knoop hardness of 2050.

Example 5

After grinding to P80 grain size (EFAP nomenclature), the products derived from the four previous examples are used to manufacture grindwheels under identical conditions. The grindwheels are then tested by a grinding test on 100C6 steel under a pressure of 0.25 MPa and at a rate of 60 M/sec.

The same testing conditions were used to test a grindwheel prepared from a mixture of 70% (by weight) of the product in example 2 and 30%. sol-gel alumina, and to test a grindwheel made entirely from sol-gel alumina.

The ratios between the mass of metal removed and the mass of grindwheel loss were measured. Results were:

| | |
|---|---|
| For the product in example 1: | 30 |
| For the product in example 2: | 50 |
| For the product in example 3: | 55 |
| For the product in example 4: | 120 |
| For the mixture (70% of the product in example 2 and 30% of sol-gel): | 150 |
| For pure sol-gel alumina: | 60 |

What is claimed is:

1. Abrasive grain containing electro-fused alumina, said abrasive grain formed of crystals of hexagonal structure less than 100 $\mu$m in size, said abrasive grain having a density that is greater than 97% of the theoretical density of alumina and a Knoop hardness of more than 2000.

2. Abrasive grain according to claim 1, wherein the crystal size is less than 30 $\mu$m.

3. Abrasive grain according to claim 2, wherein the crystal size is less than 5 $\mu$m.

4. Abrasive grain according to claim 1, wherein its density is greater than 98% of the theoretical density of alumina.

5. Abrasive grain according to claim, wherein its Knoop hardness is greater than 2050.

6. Method for producing abrasive grains containing electro-fused alumina, comprising the steps of:

melting the alumina, casting the alumina at a constant flow rate of less than 80 Kg/min, and cooling the alumina by dispersion of the molten alumina in fine droplets resulting in particles having a size of less than 1 mm.

7. Method according to claim 6, wherein the casting flow rate is less than 50 kg/min.

8. Method according to claim 6, wherein casting is conducted through a nozzle heated by induction.

9. Method according to claim 6, wherein the dispersion of the molten alumina is obtained by ultrasound assisted atomization.

10. Method according to claim 9, wherein the ultrasound assisted atomization occurs at a frequency between 15 and 50 kHz.

* * * * *